(12) United States Patent
Turner et al.

(10) Patent No.: US 9,865,309 B2
(45) Date of Patent: Jan. 9, 2018

(54) DUAL DIFFUSION PATH FILTERING

(75) Inventors: Robert Dean Turner, Thornton, CO (US); David Andrew Olivero, Westminster, CO (US); Yue Ma, Boulder, CO (US); Quinn Jay Haddock, Longmont, CO (US)

(73) Assignee: SEAGATE TECHNOLOGY LLC, Scotts Valley, CA (US)

( * ) Notice: Subject to any disclaimer, the term of this patent is extended or adjusted under 35 U.S.C. 154(b) by 744 days.

(21) Appl. No.: 12/617,282

(22) Filed: Nov. 12, 2009

(65) Prior Publication Data

US 2011/0109989 A1    May 12, 2011

(51) Int. Cl.
 *G11B 33/14*    (2006.01)

(52) U.S. Cl.
 CPC ........ *G11B 33/146* (2013.01); *G11B 33/1486* (2013.01)

(58) Field of Classification Search
 USPC ........................................ 360/97.02
 See application file for complete search history.

(56) References Cited

U.S. PATENT DOCUMENTS

| | | | |
|---|---|---|---|
| 4,863,499 A * | 9/1989 | Osendorf ............. | B01D 50/002 360/99.18 |
| 5,030,260 A * | 7/1991 | Beck ...................... | B01D 50/00 360/903 |
| 5,590,001 A * | 12/1996 | Ino et al. ................... | 360/97.02 |
| 6,822,824 B2 | 11/2004 | Macpherson | |
| 6,940,687 B2 | 9/2005 | Hong et al. | |
| 7,082,012 B2 | 7/2006 | Macpherson et al. | |
| 7,349,178 B2 | 3/2008 | Tadepalli et al. | |
| 7,388,731 B1 | 6/2008 | Little et al. | |
| 7,409,695 B2 | 8/2008 | Omori et al. | |
| 7,486,474 B2 | 2/2009 | Shin et al. | |
| 2003/0218828 A1 | 11/2003 | Hong et al. | |
| 2003/0218829 A1 | 11/2003 | Hong et al. | |
| 2003/0227711 A1 | 12/2003 | Macpherson | |
| 2005/0036232 A1* | 2/2005 | Macpherson .............. | 360/97.02 |
| 2005/0063093 A1* | 3/2005 | Hong .................. | G11B 33/1486 360/97.18 |
| 2005/0139077 A1* | 6/2005 | Garikipati .......... | B01D 53/0415 96/130 |
| 2005/0139078 A1* | 6/2005 | Tuma ................. | B01D 53/0415 96/134 |
| 2005/0168868 A1* | 8/2005 | Shin et al. .................. | 360/97.02 |
| 2007/0256396 A1* | 11/2007 | Oh et al. ...................... | 55/385.6 |
| 2009/0090245 A1* | 4/2009 | Olszewski ......... | B01D 46/0005 96/154 |

* cited by examiner

*Primary Examiner* — David D Davis
(74) *Attorney, Agent, or Firm* — Hall Estill Attorneys at Law

(57) ABSTRACT

An apparatus and associated method for enclosing an environment-sensitive component. An enclosure separates an interior environment inside the enclosure from an external environment outside the enclosure. The enclosure has an environmental control system that captures a contaminant from the internal environment to a filter via a first diffusion path, and captures the contaminant from the external environment to the same filter via a different second diffusion path, the diffusion paths providing substantially different flow resistances to fluids carrying the contaminants to the filter via the respective diffusion paths.

19 Claims, 5 Drawing Sheets

DUAL DIFFUSION PATH FILTERING

FIELD

The present embodiments relate generally to electronic device enclosures for environment-sensitive components and more particularly but without limitation enclosure filtration to protect the environment-sensitive components.

BACKGROUND

With the recent proliferation of electronics into consumer products, and the consequential requirements for robust electronics residing in a portable enclosure, the adverse effects of contamination and environmental conditions in the enclosure come to the forefront as an issue that must be effectively addressed.

In some attempted solutions a passageway of a controlled size is provided in the enclosure so that internal and external state conditions can seek equilibrium under control, lessening the adverse affects on the enclosure of things like ambient pressure and temperature variation. In other attempted solutions a filter captures contaminants to prevent them from adversely affecting sensitive components inside the enclosure.

Adsorption type filters offer some benefits in that they can advantageously capture and release contaminants such as moisture to maintain a moisture-to-fluid ratio in a range that provides a desired relative humidity. However, sudden changes in temperature are problematic for an adsorption filter system. Sudden heating, such as by starting a motor or placing the enclosure in sunlight, can quickly vaporize too much previously adsorbed moisture, driving the relative humidity in the enclosure too high. Conversely, sudden cooling can quickly condense the previously adsorbed moisture, spilling it onto the electronics components in the enclosure.

Improvements are needed for filtering the enclosure of a device that contains an environment-sensitive component. It is to those improvements that embodiments of the present invention are directed.

SUMMARY

The present embodiments are generally directed to enclosure filtration to protect an environment-sensitive component.

In some embodiments an apparatus is provided that has an enclosure sized to contain an environment-sensitive component. The enclosure is capable of separating an internal environment inside the enclosure from an external environment outside the enclosure. A filter is fluidly coupled to the enclosure. The filter has a housing containing a filter media. The filter also has a first diffusion path fluidly connecting the filter media to the internal environment, and a second diffusion path fluidly connecting the filter media to the external environment, wherein a flow resistance of the second diffusion path is lower than a flow resistance of the first diffusion path.

In some embodiments an enclosure is provided for an environment-sensitive component that separates an interior environment inside the enclosure from an external environment outside the enclosure. The enclosure has an environmental control system that captures a contaminant from the internal environment to a filter via a first diffusion path, and captures the contaminant from the external environment to the same filter via a different second diffusion path, the diffusion paths providing substantially different flow resistances to fluids carrying the contaminants to the filter via the respective diffusion paths.

In some embodiments a method is provided for operating an apparatus having an environment-sensitive component. The method includes the step of placing the environment-sensitive component in an enclosure that separates an internal environment inside the enclosure from an external environment outside the enclosure, whereby the enclosure is fluidly coupled to a filter housing containing a filter media such that the filter media is fluidly connected to the internal environment via a first diffusion path and is fluidly connected to the external environment via a second diffusion path, and wherein a flow resistance of the second diffusion path is lower than a flow resistance of the first diffusion path. The method further includes the step of subjecting the apparatus to first environmental state conditions causing the filter media to capture contaminants from at least one of the internal and external environments. The method also includes the step of subsequently subjecting the apparatus to second environmental state conditions causing the filter media to release the previously captured contaminants from the filter media via simultaneous fluid flows through both diffusion paths.

DETAILED DESCRIPTION

Figure 1:
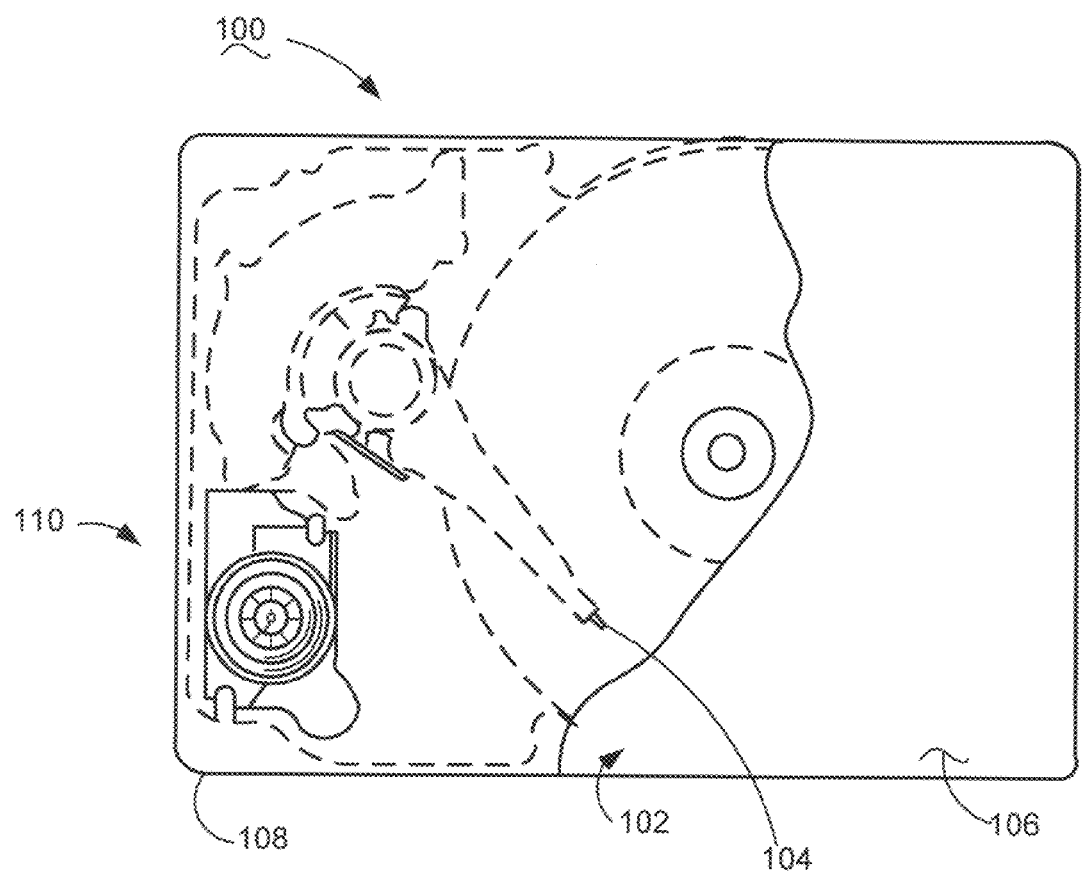
FIG. 1 is a top view of an electronics device that is constructed in accordance with illustrative embodiments of the present invention.

In setting forth a description of various embodiments of the present invention, reference is first made to FIG. 1 which depicts an electronic device 100 that is constructed in accordance with illustrative embodiments of the present invention. Although the skilled artisan readily recognizes the device 100 to be a disc drive data storage device, certainly the scope of the present embodiments as defined by the appended claims is not so limited.

The scope of the claimed embodiments generally encompasses a device having an enclosure that insulates an internal environment inside the enclosure from an external environment outside the enclosure. By "insulates" it is meant that a changed environmental state or the existence of contaminants in one of the internal or external environments has an intentionally delayed impact on the other environment by virtue of an enclosure feature. Generally, the enclosure insulates the internal environment by providing to some extent a sealed vessel, which can advantageously employ a diffusion path to mitigate the adverse effects of contaminants in a manner described below. The purpose for insulating the internal environment is to protect one or more environment-sensitive components residing therein. The environment-sensitive component is likely to be rated reliable only when used within specified environmental state ranges, such as within prescribed temperature or humidity ranges and the like.

That said, no complete or even partial enumeration of what types of devices might benefit from practicing the present embodiments is necessary for the skilled artisan to comprehend the scope of the claimed embodiments. Similarly, the skilled artisan needs no enumeration as to the nature of what environmental sensitivity a component might have to readily comprehend the scope of the claimed embodiments. The description that follows is merely illustrative and not limiting in any way to the scope of the claimed embodiments. In equivalent alternative embodiments the device having an enclosure containing an environment-sensitive component can be any of a number of other devices such as but not limited to solid state storage devices, measurement devices, communications devices, and the like.

Turning now to the illustrative embodiments, FIG. 1 shows the device 100 has an enclosure 102 that is appropriately sized to contain environment-sensitive components, such as the head 104 that operates in a data transfer relationship with the spinning storage disc in the illustrative embodiments. The areal density with which data are stored to the disc has increased exponentially in recent years, demanding more precision in positionally controlling the head 104 with respect to data recording tracks on the disc. Consequently, some types and levels of environmental contaminants that could once be ignored for having a negligible affect must now be effectively remediated. Limiting the size and number of particulates inside the enclosure 102, for example, becomes ever more important as more scrutiny is placed on the magnitude and allowable variation of the head 104 fly height. For example, the relative humidity must be maintained within an acceptable range or it will have an adverse affect on the head 104 flying performance. Condensation creates unacceptable stiction conditions between the head 104 and the disc. Other organic contaminants must be prevented from accumulating inside the enclosure 102 due to their adverse corrosive effects on the head 104 and other components.

It is noted that the working components of the device 100 are depicted in FIG. 1 by broken lines to deemphasize them in comparison to the elements that are important to an understanding of the scope of the claimed embodiments. The enclosure 100 itself, for example, is depicted in solid lines and in the illustrated embodiments is constructed by joining a cover 106 (depicted partially torn away) to a hollowed-out base 108 to enclose the environment-sensitive components. Also depicted in solid lines is an environmental control system 110 that is capable of capturing a contaminant either from the internal environment inside the enclosure 102 or from the external environment outside the enclosure 102.

Figure 2:
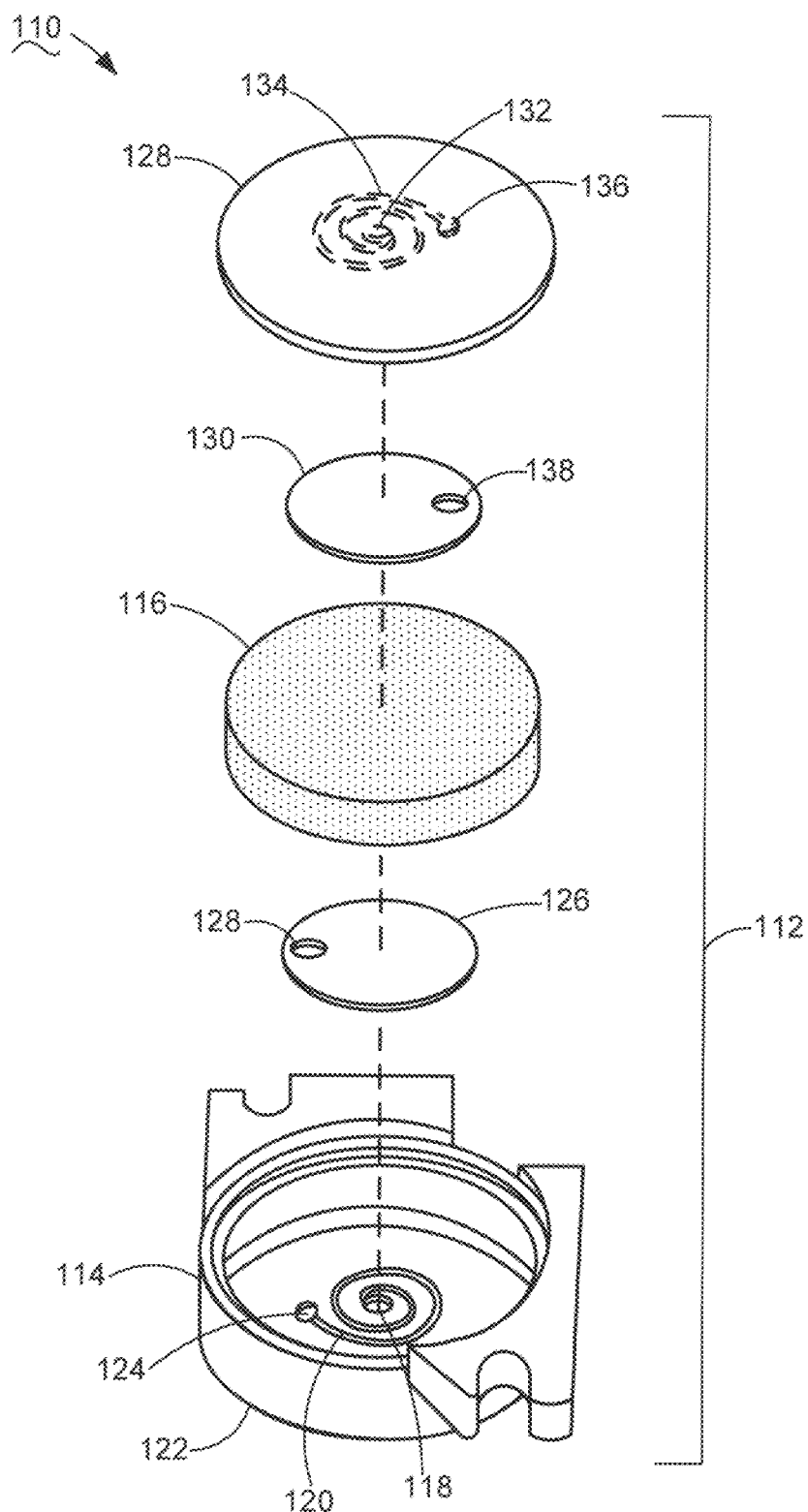
FIG. 2 is an exploded isometric view of the filter in the electronics device of FIG. 1.

FIG. 2 is an exploded isometric view of a filter 112 portion of the environmental control system 110. The filter 112 is fluidly coupled to the enclosure 102 as described below. The filter 112 includes a cup-shaped housing 114 that is sized to contain a filter media 116. An enumeration of types of filter media 116 is not necessary for the skilled artisan to understand the scope of the claimed embodiments, although in successful trials both chemically treated activated carbon and silica, and combinations thereof, were successfully used.

In the illustrative embodiments the housing 114 has an opening 118 that provides a passageway for fluid communication into and out of the housing 114. A diffusion path 120 is shown as being unitarily formed in the end 122 of the housing 114, spiraling outwardly from a fluid communication with the opening 118 at one end and terminating at a fluid communication with an enlarged reservoir 124 at the other end. The diffusion path 120 and reservoir 124 do not extend through the end 122, and can be constructed such as by etching, molding, or cutting an indentation to a depth that is less than a material thickness of the end 122.

A disk 126 is attached to the end 122, such as by adhering it, to close the opening 118 and diffusion path 120 inside the housing 114. An opening 128 operably aligns with the reservoir 124 to place that end of the diffusion path 120 in fluid communication with the inside of the housing 114. Thus, fluid communication is established between the filter media 116 inside the housing 114 and the environment outside the housing 114 via the inlet 118, diffusion path 120, reservoir 124, and opening 128.

Figure 3:
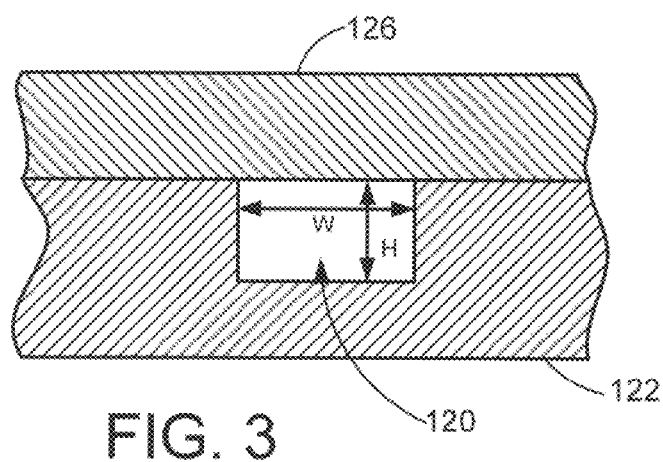
FIG. 3 is a cross-sectional view of a medial portion of the diffusion path between the filter media and the external environment.

FIG. 3 is a cross-sectional view of the disk 126 operably attached to the end 122 at a medial portion of the diffusion path 120. In these illustrative embodiments the diffusion path 120 is formed by a rectangular cavity in the end 122 defining a cross-sectional area (A) that is the product of the width (W) and the height (H). The length (L) of the diffusion path is ascertainable as the arcuate length from the opening 118 to the reservoir 124. One way of quantifying the flow resistance (R) of the diffusion path as encountered by a fluid passing through it is in terms of the ratio of cross-sectional area (A) to length (L):

$$R = \frac{A}{L}$$

Returning to FIG. 2, the filter 112 further has another end 128 that is attached to the housing 114 to enclose the filter media 116. A disk 130 is attached to the end 128 to provide a similar flow passage arrangement to that described above, cooperatively constructed of an opening 132, a diffusion path 134, a reservoir 136, and an opening 138. As above, the inlet 132 extends through the end 128 and the opening 138 extends through the disk 130. The diffusion path 134 and the reservoir 136 do not extend through the end 128 but are capped by attachment of the disk 130 (such as by adhering) to the end 128 to provide a fluid passageway between the filter media 116 inside the housing 114 and the environment outside the housing 114.

Figure 4:
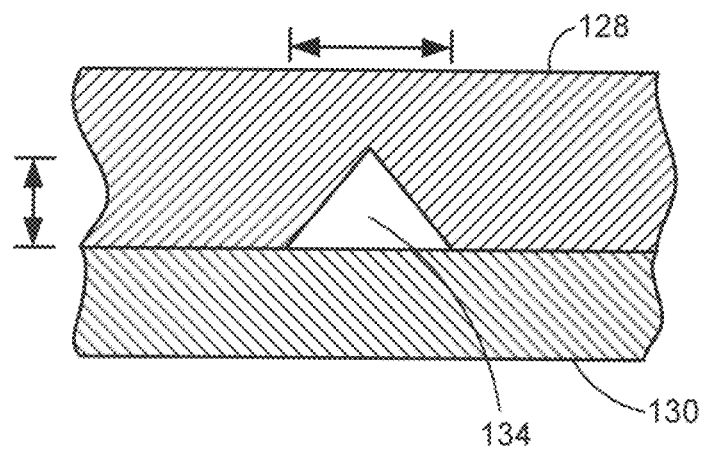
FIG. 4 is a cross-sectional view of a medial portion of the diffusion path between the filter media and the internal environment.

FIG. 4 is a cross-sectional view of illustrative embodiments whereby the diffusion path 134 provides a different flow resistance than the previously described diffusion path 120. Assuming the lengths of the diffusion paths 120, 134 are substantially the same, then the flow resistance of the diffusion path 134 would be twice that of the flow resistance of the diffusion path 120 because the triangular cross-sectional area of the diffusion path 134 is half that of the rectangular cross-sectional area of the diffusion path 120. Clearly, the different flow resistance values can alternatively be obtained by making the lengths of the diffusion paths different, or by a combination of both different cross-sectional areas and different lengths.

Figure 5:
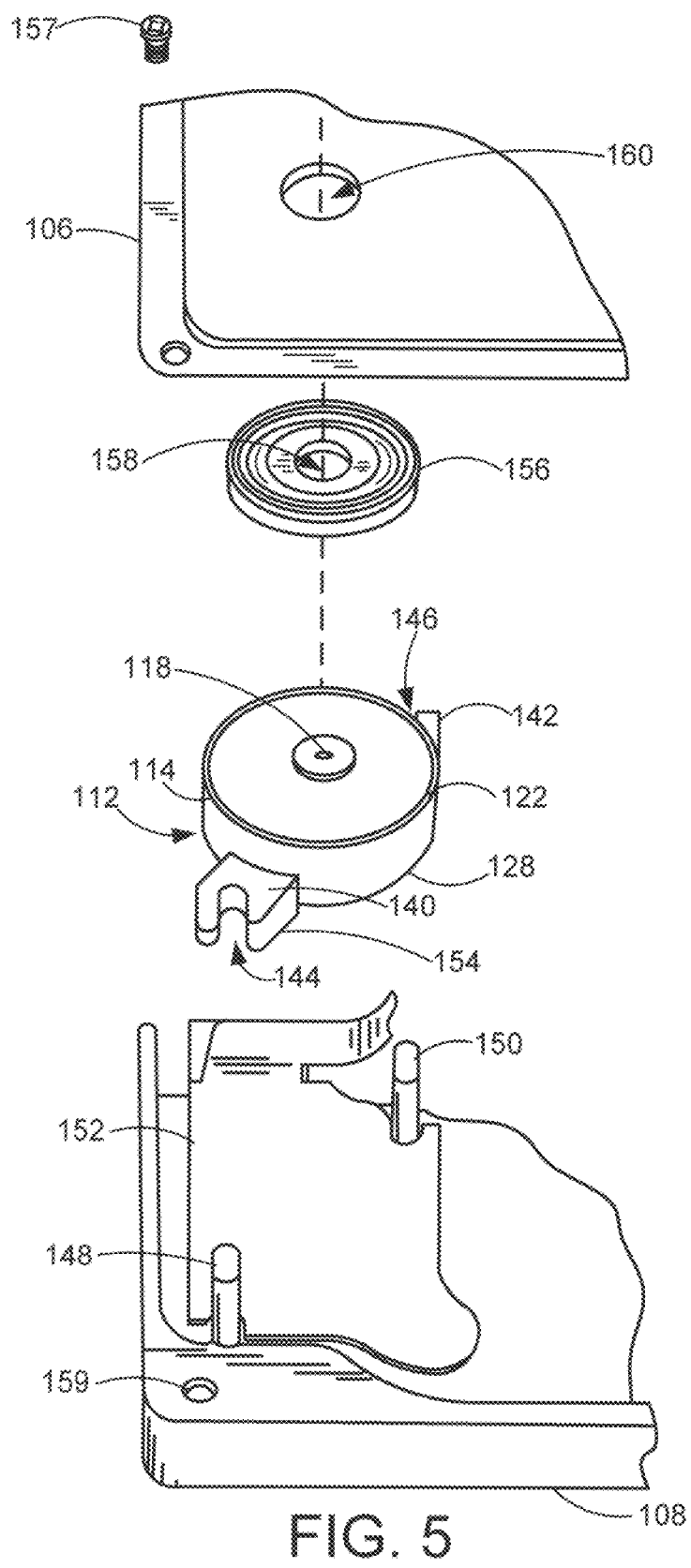
FIG. 5 is an exploded isometric view of an environmental control system for an enclosure that is constructed in accordance with illustrative embodiments of the present invention.

FIG. 5 is an exploded view of the previously described filter 112, further describing how it functions in some illustrative embodiments of the environmental control system 110 of the present embodiments. These embodiments provide manufacturability advantages of top-down assembly with a minimum requirement for removable fasteners, although the present embodiments are not so limited. By "top-down" assembly it is meant that the device 100 is progressively assembled by a stacking up of parts in the vertical direction to advantageously employ gravity as an aid in fixturing the parts as they are assembled together.

In these illustrative embodiments the housing 114 includes a pair of opposing protuberant arms 140, 142. Each arm defines a notch 144, 146 that is sized to receivingly engage a pair of upstanding posts 148, 150 that are also used in like manner to attach the flex circuit bracket 152 without the need for removable fasteners. Note that a bottom surface 154 of the protuberant arms 140, 142 abuttingly engages the planar surface of the flex circuit bracket 152. The lower end 128 is offset upwardly from the lower surface 154 so that the arms 140, 142 serve as stand-offs for the housing 114, providing for a flow passage into and out of the filter 112 through the lower end 128.

A seal 156 is stacked on the filter 112. The filter 112 and seal 156 are together compressingly engaged by the operable attachment of the cover 106 to the base 108, such as by the use of removable fasteners 157. For example, the removable fasteners 157 can pass through a clearance hole in the cover 106 and threadingly engage respective threaded openings 159 in the base 108. This compressing engagement advantageously permits affixing the filter 112 to the enclosure 102 without the use of removable fasteners except for the fasteners 157 used to attach the cover 106 to the base 108.

An opening 158 in the seal 156 aliens with an opening 160 in the cover 106 to provide unencumbered access of the opening 118 of the filter 112 to the external environment outside the enclosure 102. Accordingly, the diffusion path 120 (FIG. 2) is placed entirely in fluid communication with the external environment outside the enclosure 102 via the opening 118. The stacking dimensions and tolerances are such that the operable attachment of the cover 106 to the base 108 sufficiently compresses the seal 156 both against the top end 122 of the filter 112 and against the inside surface of the cover 106 so that no fluid passageway is created into and out of the enclosure 102 but for that which includes the diffusion path 120 via the opening 118.

A caveat, however, is that it is possible to size a diffusion path with a high enough flow resistance that other sealed openings, such as the one closed off by the seal 156, might provide a path of lesser resistance. For that reason, the pressure drop across the diffusion path is effectively limited to not only that which permits the minimum desired fluid flow, but also effectively limited by how robustly the rest of the enclosure 102 is sealed.

Accordingly, from the foregoing the skilled artisan will understand that the present embodiments generally contemplate an enclosure 102 with a filter 112 coupled thereto. The filter 112 contains a filter media 116. A first diffusion path 134 fluidly connects the filter media 116 to the internal environment inside the enclosure 102. A second diffusion path 120 fluidly connects the filter media 116 to the external environment outside the enclosure 102. A flow resistance of the second diffusion path 120 is lower than a flow resistance of the first diffusion path 134.

Figure 6:
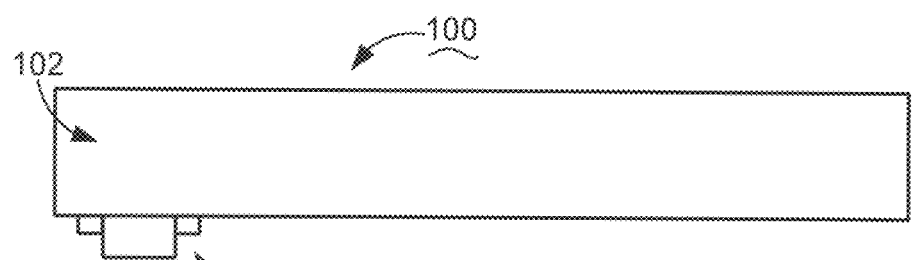
FIG. 6 is an elevational view of an environmental control system for an enclosure that is constructed in accordance with alternative illustrative embodiments of the present invention.

In the depicted embodiments the filter 112 is operably supported inside the enclosure 102, but in equivalent alternative embodiments the filter 112 can be operably supported outside the enclosure as depicted in FIG. 6. In these embodiments the filter 112 is not constrained by the operable attachment of the cover 106, so removable fasteners can be used to attach the filter 112 to the enclosure 102. Although not depicted, it will be understood that a seal could be compressingly engaged between the filter 112 and the enclosure 102 by the operable attachment of the removable fasteners.

Figure 7:
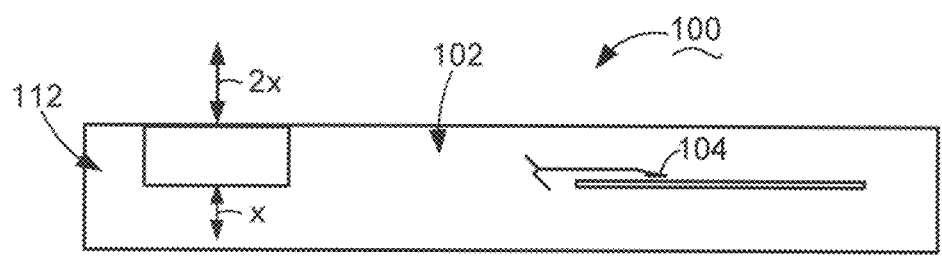
FIG. 7 diagrammatically depicts the differential diffusion rates of the environmental control system of FIG. 5.

FIG. 7 diagrammatically depicts the construction described heretofore wherein the filter 112 contains filter media 116 that is in fluid communication with the internal environment inside the enclosure 102 via the diffusion path 134 that has particular flow resistance value. For purposes of this description it will be assumed that the flow resistance of the diffusion path 134 permits a diffusion rate through the diffusion path 134 represented by the arbitrary value denoted "X." Accordingly, because the flow resistance of the diffusion path 120 is half that of the flow resistance of the diffusion path 134, the diffusion path 120 permits twice the diffusion rate, which is comparatively denoted "2X." The diffusion rate values "X" and "2X" are illustrative only of the differential diffusion rates of the present embodiments and do not in any way limit or attempt to characterize the present embodiments. The optimal diffusion rates will be a function of the operating conditions and the desired state of the internal environment. For example, without limitation, in successful trials of the present embodiments in some cases it was found to be advantageous to set the two diffusion rates at levels of "X" and "40X." Whatever the desired diffusion rates are, the flow resistances that provide them can be obtained by selectively sizing the cross-sectional area and length of the diffusion paths.

For purposes of filtering the internal environment of the device 100 it has been determined to be advantageous to construct the filter media 116 of an adsorbent material such as activated carbon. Such a filter is well adapted for adsorbing ambient moisture from the internal environment when the temperature is relatively cool. When the temperature increases, then moisture retained by the filter media 116 is released back into the internal environment, keeping the relative humidity within a prescribed range. The activated carbon can be chemically treated such as with salt additives to also make it capable of adsorbing acidic gases and organic contaminants that adversely affect the performance of the device 100.

During normal operational cycling, or "on-off cycling," the filter media 116 both adsorbs moisture at lower temperatures and releases moisture at higher temperatures in order to regulate the relative humidity of the internal environment. Reducing the variation in relative humidity advantageously provides enhanced head 104 fly height performance. However, during unusually long cool periods, such as during extended down time and during warehousing, more moisture than normal can collect in the filter media 116. Suddenly heating the device after an extended idle time, such as by activating it, can create conditions that cause too much moisture to be released into the internal environment. In that circumstance the relative humidity can become too high and adversely affect the device 100 performance.

The dual diffusion paths 120, 134 make it possible to release the previously adsorbed moisture from the filter 116 simultaneously to the internal environment and to the external environment. The differential diffusion rates make it possible to prevent slugging the internal environment with too much moisture by providing a path of relatively lower flow resistance to unload the surplus moisture from the filter 116 to the external environment. The diffusion rate necessary to regulate the relative humidity of the internal environment during the thermal state transition is set by sizing the diffusion path 134 to produce the corresponding flow resistance. The diffusion path 120 is sized relatively larger to effectively purge the filter media 116 of the excess moisture during the time the equilibrium is sought in the internal volume. For example, the diffusion rate to the external environment might be set so that by the time the internal environment reaches equilibrium the filter media 116 will have dried out from an expected maximum moisture content (such as but not limited to 90% of saturation) to a target moisture content (such as but not limited to 10% of saturation).

Figure 8:
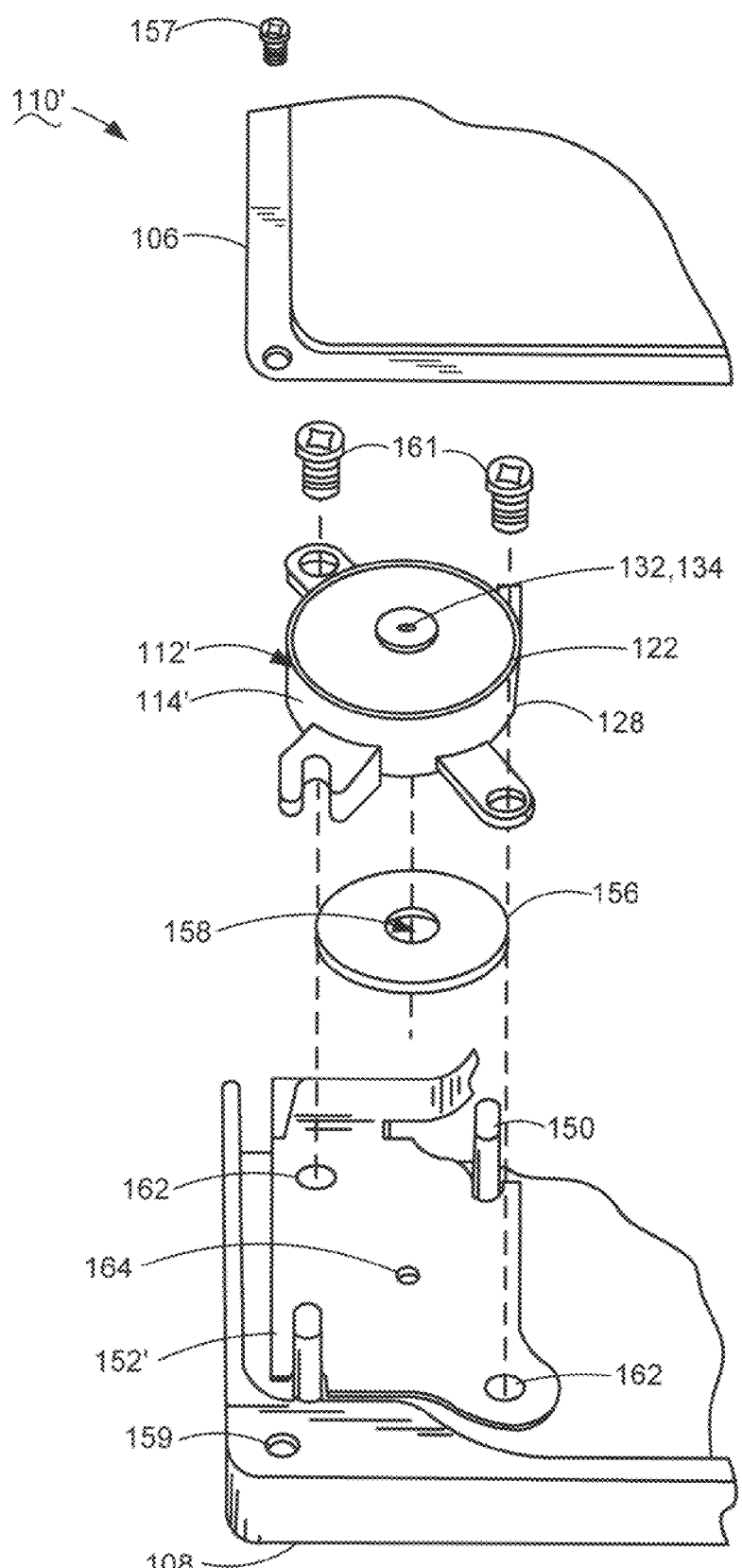
FIG. 8 is an exploded isometric view of an environmental control system for an enclosure that is constructed in accordance with alternative illustrative embodiments of the present invention.

FIG. 8 depicts an environmental control system 110' that is constructed in accordance with alternative illustrative embodiments of the present invention. In the filter 112' the diffusion paths 120, 134 are swapped end-to-end as compared to the filter 112 described in FIG. 5. That is, the filter 112' has the high flow resistance diffusion path 134 and opening 132 disposed at the upper end 122 of the housing 114, and has the relatively low flow resistance diffusion path 120 and opening 118 disposed at the lower end 128 of the housing 114. As before, however, the filter media 116 is in operable fluid communication with the external environment via the low flow resistance diffusion path 120 and in operable fluid communication with the internal environment via the high flow resistance diffusion path 134.

The filter 112' mounts to the base 108' via removable fasteners 161 that engage threaded openings 162 provided in the base 108'. Advancement of the fasteners 161 compressingly engages the gasket 156 between the surface of the lower end 128 of the housing 114' and the exposed surface of the flex circuit bracket 152'. An opening 164 is provided through the flex circuit bracket 152' that operably aligns with the opening 158 in the gasket 156 and the opening 118 (not shown) in the bottom end 128 of the housing 114' so that the filter media 116 is operably placed in fluid communication with the external environment outside the enclosure 102. The cover 106 is attached to the base 108 as above except that the dimensions of the stacked components are such that a clearance is provided between the inside surface of the cover 106 and the opening 132 in the upper end 122 of the housing. That clearance permits the filter media 116 to be in fluid communication with the internal environment inside the enclosure 102 via the high flow resistance diffusion path 134.

In addition to the apparatus set forth in the various embodiments above, the present embodiments also contemplate an associated method for operating an apparatus having an environment-sensitive component. The method includes the step of placing the environment-sensitive component in the enclosure 102 that insulates the internal environment inside the enclosure 102 from the external environment outside the enclosure 102. The method further includes fluidly coupling the filter housing 114' containing the filter media 116 to the enclosure 102 so that the filter media 116 is fluidly connected to the internal environment via the first diffusion path 134, and so that the filter media 116 is fluidly connected to the external environment via the second diffusion path 120, wherein a flow resistance of the second diffusion path 120 is lower than a flow resistance of the first diffusion path 134.

The method then includes the step of subjecting the apparatus to first environmental state conditions causing the filter media 116 to capture contaminants from at least one of the internal and external environments. For example, without limitation, the device 100 can be subjected to an extended period of relatively low thermal state conditions. For example, during an extended idle time, or for another example during warehousing or transit, the device 100 remains relatively cool. During cool state conditions the filter media 116 adsorbs moisture from the comparatively moisture-laden environments both inside and outside the enclosure 102. The filter media 116 may eventually reach a state of equilibrium with the finite internal environment but continue to adsorb moisture from the infinite external environment.

The method further includes subsequently subjecting the apparatus to second environmental state conditions causing the filter media 116 to release the previously captured contaminants. For example, activating the device 100 generates heat from multiple sources, predominantly of which is heat generated by the high-speed spindle motor. As the internal environment is heated, a greater water to air (or other environment fluid such as helium) ratio is necessary to maintain a desired relative humidity, causing the filter media 116 to give up adsorbed moisture. The high flow resistance of the diffusion path 134 coupling the filter media 116 to the internal environment creates an intentionally timed release of the adsorbed moisture to the internal environment, preventing the filter media 116 from slugging the internal environment with too much moisture. During that timed release, the low flow resistance of the diffusion path 120 permits the excess moisture in the filter media 116 to be dumped harmlessly to the external environment.

The present embodiments therefore include unexpected and novel advantages as detailed herein and as can be further appreciated by the skilled artisan from the claims, figures, and description. Although some of the embodiments are described in reference to a data storage system, and even to a disc drive data storage device, the skilled artisan recognizes without enumeration that the claimed invention has various other embodiments with application to other electronic devices as well that have environment-sensitive components.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present embodiments, to the full extent indicated by the broad, general meaning of the terms in which the appended claims are expressed. It will be appreciated by those skilled in the art that the teachings of the present embodiments can be applied to a family of systems, devices, and means encompassed by and equivalent to the examples of embodiments described, without departing from the scope and spirit of the claimed embodiments. Further, still other applications for various embodiments, including embodiments not involving moving media storage but rather particularly pertaining to solid state devices, are included within the claimed embodiments.

What is claimed:

1. An apparatus comprising:
   an enclosure; and
   a filter connected to the enclosure, the filter comprising:
      a housing having a first end and an opposing second end defining an internal cavity between the ends;
      a filter media in the cavity;

a first diffusion path on one side of the filter media sized to define a first nonzero flow resistance to an environmental fluid diffusing from the filter media to the inside of the enclosure; and a second diffusion path on an opposing side of the filter media sized to define a second nonzero flow resistance to the environmental fluid diffusing from the filter media into an ambient atmosphere outside the enclosure, wherein the second nonzero flow resistance is lower than the first flow resistance.

2. The apparatus of claim 1 wherein at least one of the diffusion paths is placed in fluid communication entirely with the external environment outside the enclosure by a seal between the enclosure and the second end.

3. The apparatus of claim 2 wherein the enclosure comprises a base and a cover removably connected to the base, wherein the seal is compressingly engaged against the second end by the operable attachment of the cover to the base.

4. The apparatus of claim 3 wherein the housing is operably supported inside the enclosure without any removable fasteners except for removable fasteners that are used to operably attach the cover to the base.

5. The apparatus of claim 2 wherein the seal is compressingly engaged against the second end of the housing as a direct result of the operable attachment of a fastener that mounts the housing to the enclosure.

6. The apparatus of claim 1 wherein at least one of the diffusion paths is formed as a unitary portion of the respective end.

7. The apparatus of claim 6 wherein both of the diffusion paths are formed as unitary portions of the respective end.

8. The apparatus of claim 1 wherein the flow resistance of each diffusion path is defined in terms of a ratio of a cross-sectional area of the diffusion path to a length of the diffusion path.

9. The apparatus of claim 1 wherein the filter media operably adsorbs contaminants from at least one of the diffusion paths in a first environmental state of the apparatus.

10. The apparatus of claim 9 wherein the filter media operably releases the previously adsorbed contaminants simultaneously to both diffusion paths in a second environmental state of the apparatus.

11. The apparatus of claim 10 wherein the contaminant is associated with a relative humidity.

12. An enclosure for containing an environment-sensitive component, the enclosure comprising an environmental control system that captures a contaminant from the environment to a filter media via a first diffusion path on one side of the filter media and sized to define a first nonzero flow resistance to an environmental fluid diffusing from the filter media to the inside of the enclosure, and that captures the contaminant from the environment to the same filter media via a different second diffusion path on an opposing side of the filter media and sized to define a second nonzero flow resistance to the environmental fluid diffusing from the filter media into the ambient atmosphere outside the enclosure, the diffusion paths further sized so that the second nonzero flow resistance is lower than the first nonzero flow resistance.

13. The enclosure of claim 12 wherein the environmental control system comprises a housing operably containing the filter, the housing having a first end on one side of the filter and forming the first diffusion path, and a second end having a second end on an opposing side of the filter and forming the second diffusion path, wherein a flow resistance of the second diffusion path is lower than a flow resistance of the first diffusion path.

14. The enclosure of claim 13 wherein the flow resistance of each diffusion path is defined in terms of a ratio of a cross-sectional area of the diffusion path to a length of the diffusion path.

15. The enclosure of claim 12 wherein the filter operably adsorbs the contaminant.

16. The enclosure of claim 15 wherein the environmental control system, in response to an environmental state change, operably releases previously adsorbed contaminants simultaneously via both diffusion paths.

17. The enclosure of claim 16 wherein the environmental control system, in response to the environmental state change, operably releases previously adsorbed contaminants simultaneously via both diffusion paths at rates defined by first and second flow resistances, respectively, wherein the second flow resistance is less than the first flow resistance.

18. The enclosure of claim 17 wherein the contaminant is associated with a relative humidity of the internal environment.

19. A method for operating an apparatus having an environment-sensitive component, the method comprising:
placing the environment-sensitive component in an enclosure coupled to a filter housing containing a filter media, the filter housing having a first end and an opposing second end defining an internal cavity between the ends, a filter media in the cavity, the first end forming a first diffusion path sized to define a first nonzero flow resistance to an environmental fluid flowing through the filter housing, and the second end forming a second diffusion path sized to define a second nonzero flow resistance to the environmental fluid flowing through the filter housing, wherein the second nonzero flow resistance is lower than the first nonzero flow resistance;
subjecting the apparatus to first environmental state conditions causing the filter media to capture contaminants via at least one of the diffusion paths; and
subsequently subjecting the apparatus to second environmental state conditions causing the filter media to release the previously captured contaminants from the filter media via both diffusion paths.

* * * * *